United States Patent

Kühling et al.

Patent Number: 5,418,316
Date of Patent: May 23, 1995

[54] GUANIDINE-DERIVED CATALYTS FOR PREPARING POLYCARBONATES BY TRANSESTERIFICATION

[75] Inventors: Steffen Kühling, Meerbusch; Hermann Kauth; Wolfgang Alewelt, both of Krefeld, all of Germany

[73] Assignee: Bayer Aktiengesellschaft, Leverkusen, Germany

[21] Appl. No.: 257,400

[22] Filed: Jun. 9, 1994

[30] Foreign Application Priority Data

Jun. 18, 1993 [DE] Germany .................. 43 20 156.3

[51] Int. Cl.$^6$ ............................................. C08G 64/00
[52] U.S. Cl. ................................. 528/199; 528/196; 528/198
[58] Field of Search ................... 528/199, 196, 198

[56] References Cited

U.S. PATENT DOCUMENTS

| | | | |
|---|---|---|---|
| 3,442,854 | 5/1969 | Curtius et al. | 528/198 |
| 4,262,113 | 4/1981 | Jacquiss et al. | 528/199 |
| 5,026,817 | 6/1991 | Sakashita et al. | 528/199 |
| 5,097,002 | 3/1992 | Sakashita et al. | 528/199 |
| 5,142,018 | 8/1992 | Sakashita et al. | 528/199 |
| 5,151,491 | 9/1992 | Sakashita | 528/199 |
| 5,276,129 | 1/1994 | Sakashita | 528/198 |
| 5,278,279 | 1/1994 | Kanno et al. | 528/198 |
| 5,319,066 | 6/1994 | King, Jr. | 528/199 |

FOREIGN PATENT DOCUMENTS

| | | |
|---|---|---|
| 487208 | 5/1992 | European Pat. Off. . |
| 529093 | 3/1993 | European Pat. Off. . |
| 535261 | 4/1993 | European Pat. Off. . |
| 1031512 | 6/1958 | Germany . |
| 4714742 | 5/1972 | Japan . |
| 4122727 | 4/1992 | Japan . |

*Primary Examiner*—John Kight, III
*Assistant Examiner*—Terressa M. Mosley
*Attorney, Agent, or Firm*—Joseph C. Gil; Aron Preis

[57] ABSTRACT

The present invention provides a transesterification process for the production of thermoplastic, solvent-free polycarbonates by the use of catalysts that are derived from guanidine.

3 Claims, No Drawings

GUANIDINE-DERIVED CATALYTS FOR PREPARING POLYCARBONATES BY TRANSESTERIFICATION

The present invention provides a transesterification process for the production of thermoplastic, solvent-free polycarbonates starting from aromatic diphenols, carbonic acid diaryl esters and optionally branching agents and/or monophenols as well as catalysts at temperatures between 80° C. and 400° C. and pressures of 1000 mbar to 0.01 mbar, that is characterized in that catalysts are used that are derived from guanidine and correspond either to formula (I),

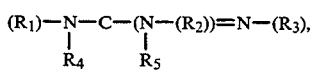

wherein
$R_1$, $R_2$, $R_3$, $R_4$, $R_5$=H, alkyl, alkenyl, cycloalkyl, cycloalkenyl or aryl and
the groups $R_1$, $R_2$, $R_3$, $R_4$ and $R_5$ can be the same or different,
or to formula (II),

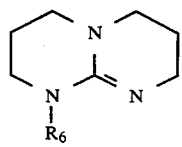

wherein
$R_6$=H, alkyl, aryl, cycloalkyl, polystyrene groups (optionally cross-linked with divinylbenzene), substituted aryls, substituted alkyls such as hydroxyalkyls, or can be $COR_7$ with $R_7$=alkyl, aryl, NH-alkyl, NH-aryl, alkoxy, aryloxy and hydroxyalkyl,
or to formula (III),

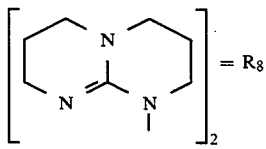

wherein
$R_8$ can be alkylidene, cycloalkylidene or arylalkylidene, or to formula (IV),

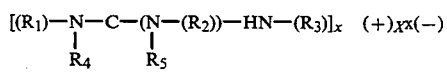

wherein
X can be carbonate, acetate, nitrate, hydroxide, halide, phenolate, diphenolate, phosphate, hydrogen phosphate or boranate and
$R_1$, $R_2$, $R_3$, $R_4$, $R_5$=H, alkyl, alkenyl, cycloalkyl, cycloalkenyl or aryl and
the groups $R_1$, $R_2$, $R_3$, $R_4$ and $R_5$ can be the same or different,
in amounts of $10^{-2}$ to $10^{-8}$ mole, relative to 1 mole diphenol.

The polycarbonates produced according to the process of the invention are solvent-free, provided with light self-colour and to a great extent free from undesirable defects in the polycarbonate.

The production of aromatic oligo-/polycarbonates according to the melt transesterification process is known from the literature and previously described for example in the Encyclopedia of Polymer Science, Vol. 10 (1969), Chemistry and Physics of Polycarbonates, Polymer Reviews, H. Schnell, Vol. 9, John Wiley and Sons, Inc. (1964) as well as DP 1 031 512.

In the above-mentioned literature sources and the literature references cited there, basic alkali metal, alkaline earth metal and transition metal hydroxides, alcoholates, carbonates, acetates, boranates, hydrogen phosphates and hydrides are described as catalysts. When these compounds are used, undesirable side-reactions occur during the transesterification that lead to structural imperfections, so that polycarbonates with uncontrolled branching are obtained (see also Comparative Example 1) that, with regard to the optical and mechanical properties, have shortcomings in properties compared with linear polycarbonate.

In JO 4 122 727 a polycondensation process is described in which, for the production of the prepolymer, large amounts ($10^{-2}$ to $10^{-5}$ mole relative to diphenol) of transesterification catalysts (Al, Ti, Ge and Sn salts, alkylpyridines, alkylimidazoles or their salts as well as phosphines) are used, and polycondensation is subsequently carried out with the aid of salts of alkali metals and alkaline earth metals. Compared with the process according to the invention, however, large amounts of catalyst must be used, which lead of necessity to a reduction of the polycarbonate quality and can be questionable with regard to toxicology. If the catalysts are volatile, the monomers eliminated, in particular the monophenol, from which in an industrial process the carbonic acid diaryl ester is produced again, are contaminated.

As catalysts for the production of polycarbonate in the melt, ammonium salts in combination with alkali metal/alkaline earth metal salts and boric acid/boric acid esters are described in EP Applications 360 578 and 351 168, tetramethylammonium hydroxide in JA 7 214 742, and 1,8-diazabicyclo[5.4.0]undec-7-ene in combination with alkali/alkaline earth metal salts in EP-A 535 261, EP-A 529 093and EP-A 559 953. This mode of processing does not lead to polycarbonates with few defect structures; furthermore for the ammonium salts and the 1,8-diazabicyclo[5.4.0]undec-7-ene the process, already mentioned above, of volatility or decomposition during the polycondensation, applies.

In U.S. Pat. No. 3,442,854, quaternary ammonium/-phosphonium compounds are described as catalysts for melt transesterification. These catalysts are volatile or decompose at the corresponding temperatures of polycondensation, so that the monophenol eliminated is contaminated.

It has now been found that with catalysts that are derived from guanidine and correspond either to formula (I),

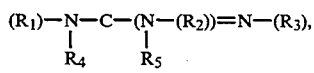

wherein
$R_1$, $R_2$, $R_3$, $R_4$, $R_5$=H, alkyl, alkenyl, cycloalkyl, cycloalkenyl or aryl and the groups $R_1$, $R_2$, $R_3$, $R_4$ and $R_5$ can be the same or different,
or to formula (II),

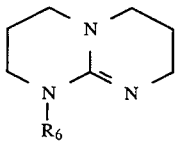

wherein
$R_6$=H, alkyl, aryl, cycloalkyl, polystyrene groups (optionally cross-linked with divinylbenzene), substituted aryls, substituted alkyls such as hydroxyalkyls, or can be
$COR_7$ with $R_7$=alkyl, aryl, NH-alkyl, NH-aryl, alkoxy, aryloxy and hydroxyalkyl,
or to formula (III),

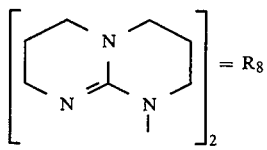

wherein
$R_8$ can be alkylidene, cycloalkylidene or arylalkylidene, or to formula (IV),

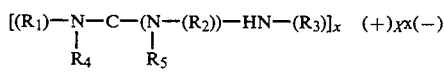

wherein
X can be carbonate, acetate, nitrate, hydroxide, halide, phenolate, diphenolate, phosphate, hydrogen phosphate or boranate and
$R_1$, $R_2$, $R_3$, $R_4$, $R_5$=H, alkyl, alkenyl, cycloalkyl, cycloalkenyl or aryl and
the groups $R_1$, $R_2$, $R_3$, $R_4$ and $R_5$ can be the same or different,
light-coloured polycarbonates are obtained and that the catalysts used are surprisingly not volatile and that the polycarbonates produced with such catalysis are to a great extent free from undesirable defects in the polycarbonate.

For the purposes of the process according to the invention, "to a great extent free from undesirable defects in the polycarbonate" means that in the polycarbonate the content of the branching structure of formula (Va)

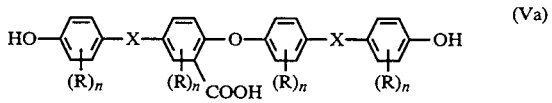

with
X=$C_1$–$C_8$ alkylidene or cycloalkylidene, S or a single bond and
R=$CH_3$, Cl or Br and
n=zero, 1 or 2
does not, according to determination by total saponification and HPLC, exceed a value of 300 ppm.

For the process according to the invention, suitable diphenols are those of formula (Vb)

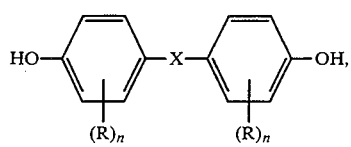

wherein
X=$C_1$–$C_8$ alkylidene or cycloalkylidene, S or a single bond and
R=$CH_3$, Cl or Br and
n=zero, 1 or 2.
Preferred diphenols are e.g.:
4,4'-dihydroxydiphenyl,
4,4'-dihydroxydiphenyl sulphide,
2,2-bis(4-hydroxyphenyl)propane,
2,2-bis(3,5-dimethyl-4-hydroxyphenyl)propane,
2,2-bis(3,5-dichloro-4-hydroxyphenyl)propane,
2,2-bis(3,5-dibromo-4-hydroxyphenyl)propane,
1,1-bis(4-hydroxyphenyl)cyclohexane and
1,1-bis(4-hydroxyphenyl)-3,3,5-trimethylcyclohexane.

Particularly preferred diphenols of those mentioned above are 2,2-bis(4-hydroxyphenyl)propane and 1,1-bis(4-hydroxyphenyl)-3,3,5-trimethylcyclohexane.

The preceding diphenols can be used for the production of homopolymers or copolymers.

The polycarbonates can be branched deliberately and in a controlled manner by the use of small amounts of branching agents. Some suitable branching agents are: phloroglucinol,
4,6-dimethyl-2,4,6-tri(4-hydroxyphenyl)heptene-2,
4,6-dimethyl-2,4,6-tri(4-hydroxyphenyl)heptane,
1,3,5-tri(4-hydroxyphenyl)benzene,
1,1,1-tri(4-hydroxyphenyl)ethane,
tri(4-hydroxyphenyl)phenylmethane,
2,2-bis[4,4-bis(4-hydroxyphenyl)cyclohexyl]propane,
2,4-bis(4-hydroxyphenyl-isopropyl)phenol,
2,6-bis(2-hydroxy-5'-methyl-benzyl-4-methylphenol,
2-(4-hydroxyphenyl)-2-(2,4-dihydroxyphenyl)propane,
hexa(4-(4-hydroxyphenyl-isopropyl)-phenyl) orthoterephthalate ester,
tetra(4-hydroxyphenyl)methane,
tetra(4-(4-hydroxyphenyl-isopropyl)phenoxy)methane,
1,4-bis (4',4''-dihydroxytriphenyl)methyl)benzene
and in particular
α,α',α''-tris(4-hydroxyphenyl)-1,3,5-triisoprenylbenzene.

Further possible branching agents are 2,4-dihydroxybenzoic acid, trimesic acid, cyanuric chloride and 3,3-bis(3-methyl-4-hydroxyphenyl)-2-oxo-2,3-dihydroindole.

The 0.05 to 2 mole % relative to the diphenols used of branching agents for optional concomitant use, can be used together with the diphenols.

For the purposes of the present invention, carbonic acid diesters are di-$C_6$–$C_{14}$ aryl esters, preferably the diesters of phenol or of alkyl-substituted phenols, that is diphenyl carbonate or e.g. dicresyl carbonate. Relative to 1 mole of bisphenol, 1.01 to 1.30 mole, preferably 1.02 to 1.15 mole, of the carbonic acid diesters are used.

Care must be taken that the reaction components, that is the diphenols and the carbonic acid diaryl esters, are free from alkali and alkaline earth ions, amounts of less than 0.01 ppm of alkali and alkaline earth ions being tolerable. Carbonic acid diaryl esters or diphenols of such purity are obtainable by recrystallizing, washing or distilling the carbonic acid diaryl esters or diphenols. In the process according to the invention the content of alkali metal and alkaline earth metal ions, both in the diphenol and in the carbonic acid diester, should have a value of less than 0.01 ppm.

Catalysts for the purposes of the process according to the invention are for example:
1,1,3,3-tetramethylguanidine,
guanidine carbonate,
2-guanidinobenzimidazole,
1,3,4,6,7,8-hexahydro-1-methyl-2-H-pyrimidino-[1,2a]pyrimidine,
1,5,7-triazabicyclo[4.4.0]dec-5-ene,
7-methyl-1,5,7-triazabicyclo[4.4.0]dec-5-ene,
7-phenyl-1,5,7-triazabicyclo[4.4.0]dec-5-ene,
7-naphthyl-1,5,7-triazabicyclo[4.4.0]dec-5-ene,
diphenylguanidine,
triphenylguanidine;
preferred catalysts are:
1,5,7-triazabicyclo[4.4.0]dec-5-ene,
7-phenyl-1,5,7-triazabicyclo[4.4.0]dec-5-ene,
7-methyl-1,5,7-triazabicyclo[4.4.0]dec-5-ene,
7-cumylphenyl-1,5,7-triazenebicyclo[4.4.0]decene,
7-hexylidene-1,5,7-triazabicyclo[4.4.0]decene,
7,7'-hexylidene-di-1,5,7-triazabicyclo[4.4.0]dec-5-ene,
7,7'-decylidene-di-1,5,7-triazabicyclo[4.4.0]dec-5-ene and
7,7'-dodecylidene-di-1,5,7-triazabicyclo[4.4.0]dec-5-ene.

These catalysts are used in amounts of $10^{-2}$ to $10^{-8}$ mole, relative to 1 mole of diphenol.

The catalysts can also be used in combination (of two or more) with each other.

The catalysts can also be used in combination (of two or more) with alkali metal/alkaline earth metal catalysts. In doing this it can be advantageous to add the alkali metal/alkaline earth metal catalysts at a later time (e.g. after the oligocarbonate synthesis during the polycondensation in the second stage). The alkali metal/alkaline earth metal catalyst can be added e.g. as a solid or as a solution in water, phenol, oligocarbonate or polycarbonate.

The alkali metal/alkaline earth metal catalysts are preferably used in amounts of $10^{-8}$ to $10^{-4}$ mole relative to 1 mole of diphenol, particularly in a concentration of $10^{-7}$ to $10^{-5}$ molar. They are for example the hydroxides, carbonates, halides, phenolates, diphenolates, fluorides, acetates, phosphates, hydrogen phosphates and boranates of lithium, sodium, potassium, caesium, calcium, barium and magnesium. The co-utilization of alkali or alkaline earth metal catalysts does not contradict the aforementioned requirement for purity of the reactants.

The polycarbonate can be produced in one stage; the aromatic dihydroxy compound and the carbonic acid diester are then reacted according to the usual polycondensation conditions from the literature. These are for example the melting of the aromatic dihydroxy compound and the carbonic acid diester at temperatures of 80° to 250° C., preferably 100° to 230° C., particularly 120° to 190° C., under normal pressure in 0 to 5 hours, preferably 0.25 to 3 hours. The catalyst according to the invention or combinations of catalysts according to the invention with alkali metal/alkaline earth metal catalysts can be added before the melting or to the melted educts. An oligocarbonate is now produced from the aromatic dihydroxy compound and the carbonic acid diester by distilling off the monophenol by applying vacuum and raising the temperature. Subsequently the polycarbonate is then produced during the polycondensation by further raising the temperature to 240° to 400° C. and reducing the pressure to 0.01 mbar.

It can also be advantageous, however, to carry out the polycondensation in two stages (first stage, oligocarbonate production with use of the catalysts according to the invention; second stage, polycarbonate production with addition of alkali metal/alkaline earth metal catalysts).

The oligocarbonates of the first stage have average molecular weights $M_W$ of 3,000 to 24,000, preferably 5,000 to 20,000, determined by measurement of the relative solution viscosity in dichloromethane or in mixtures of equal parts by weight of phenol and o-dichlorobenzene, calibrated by light scattering. The molecular weights of the oligocarbonates of the first stage depend on the desired final viscosity of the polycarbonates; thus by the condensation of low-molecular oligocarbonates, low-molecular polycarbonates are obtained in the second stage, and by the condensation of higher-molecular oligocarbonates, higher-molecular polycarbonates are obtained. The temperature for the production of these oligocarbonates is between 100° C. and 290° C., preferably between 150° C. and 280° C. The monophenols arising during the transesterification to the oligocarbonate are removed by applying a vacuum of 1 bar to 0.5 mbar, preferably of less than 500 mbar to 1 mbar. In the second stage, the polycondensation of the oligocarbonate, the polycarbonate can be produced by addition of an alkali metal/alkaline earth metal catalyst to the oligocarbonate and by further raising of the temperature to 230° to 400° C., preferably 250° to 320° C., at a pressure of less than 100 mbar to 0.01 mbar.

The reaction of the aromatic dihydroxy compound and of the carbonic acid diester can for the purposes of the process according to the invention be carried out continuously or discontinuously, for example in stirred-tank reactors, thin-film evaporators, series of stirred-tank reactors, extruders, kneaders, simple disc reactors and high-viscosity disc reactors.

The conversion of the oligocarbonate to the polycarbonate can also be carried out according to WO 90/7536 or to EP-A 338 085 by crystallizing the oligocarbonate produced according to the invention and solid-phase polycondensing it in the solid phase.

The aromatic polycarbonates of the process according to the invention have to have average molecular weights $M_W$ of 18,000 to 60,000, preferably 19,000 to 40,000, determined by measurement of the relative solution viscosity in dichloromethane or in mixtures of equal parts by weight of phenol and o-dichlorobenzene, calibrated by light scattering.

The polycarbonates produced according to the invention have a light intrinsic colour, a low OH-end-group content of less than 700 ppm, preferably less than 400 ppm, particularly less than 250 ppm, and are stable to hydrolysis and to heat.

To limit the average molecular weights $M_W$ of the polymers, molecular weight regulators, as for example alkylphenol (isooctylphenol, t-butylphenol, cumylphenol) can be used, as is known (EP 360 578), in the required amounts.

To improve the properties, auxiliary agents and reinforcing materials can be admixed with the polycarbonates produced according to the invention. To be considered as such, among other materials, are: stabilizers (e.g. UV, thermal, and gamma-radiation stabilizers), antistatic agents, flow aids, mould release agents, fireproofing agents, pigments, finely-divided minerals, fibrous materials, e.g. alkyl and aryl phosphites, phosphates, phosphanes, low-molecular carboxylate acid esters, halogen compounds, salts, chalk, quartz powder, glass fibres and carbon fibres.

Furthermore, other polymers can also be admixed with the polycarbonates according to the invention, e.g. polyolefins, polyurethanes, polystyrene.

These substances are preferably added in conventional units to the prepared polycarbonate but can be added in another stage of the process of the invention, according to the requirements.

Moreover, for particular applications it is also possible to modify the polycarbonates by condensing-in blocks, segments and comonomers, e.g. siloxane blocks with OH end groups, aromatic and aliphatic polyesters with OH and carboxylic acid end groups, poly(phenylene sulphide) blocks with OH end groups, and poly(phenylene oxide) blocks with OH end groups.

The polycarbonates produced according to the invention are suitable for the usual fields of application, that is in electrical engineering, in the building sector and in automobile construction and accordingly e.g. as a medium for data storage, for web plates for covering or as the housing material for electronic instruments.

EXAMPLES

Comparative Example 1

114.15 g (0.500 mole) bisphenol A and 113.54 g;(0.530 mole) diphenyl carbonate are weighed into a 500 ml three-necked flask with agitator, internal thermometer and Vigreux column (30 cm, metallized) with bridge. Atmospheric oxygen is removed from the apparatus by application of a vacuum and purging with nitrogen (3 moles) and the mixture heated to 150° C. 0.00029 g sodium phenolate ($5 \times 10^{-4}$ mole % relative to bisphenol A) is added as a 1% aqueous solution and the phenol arising distilled off at 100 mbar. Simultaneously the temperature is raised to 250° C. After 1 hour the vacuum is improved to 10 mbar. By lowering the vacuum to 0.5 mbar and increasing the temperature to 280° C., polycondensation is achieved. A solvent-free polycarbonate with a relative solution viscosity of 1.388 (dichloromethane, 25° C., 5 g/l) is obtained. The polycarbonate produced contains 350 ppm of the branching agent of formula (VI).

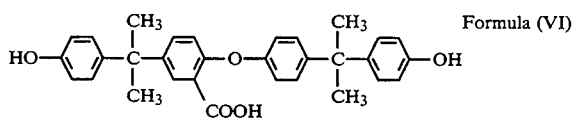

Formula (VI)

Example 1

114.15 g (0.500 mol) bisphenol A and 113.54 g (0.530 mole) diphenyl carbonate are weighed into a 500 ml three-necked flask with agitator, internal thermometer and Vigreux column (30 cm, metallized) with bridge. Atmospheric oxygen is removed from the apparatus by application of a vacuum and purging with nitrogen (3 moles) and the mixture heated to 150° C. 0.000349 g ($5 \times 10^{-4}$ mole % relative to bisphenol A) of 1,5,7-triazabicyclo[4.4.0]dec-5-ene is now added as a 1% aqueous solution and the phenol arising distilled off at 100 mbar. Simultaneously the temperature is raised to 250° C. The vacuum is now improved in stages to 1 mbar and the temperature raised to 260° C. The temperature is subsequently raised to 280° C. and the mixture agitated at 0.1 mbar for 1.5 hours. A light-coloured solvent-free polycarbonate is obtained with a relative solution viscosity of 1.255 (dichloromethane, 25° C., 5 g/l). The content of the branching agent of formula (VI) in the polycarbonate produced is 11 ppm. The phenolic OH value of the polycarbonate is 210 ppm.

Example 2

Like Example 1, but 0.000695 g ($1 \times 10^{-3}$ mole %) of 1,5,7-triazabicyclo[4.4.0]dec-5-ene is used. A light-coloured solvent-free polycarbonate is obtained with a relative solution viscosity of 1.283 (dichloromethane, 25° C., 5 g/l). The polycarbonate produced contains 15 ppm of the branching agent of formula (VI). The phenolic OH value of the polycarbonate is 300 ppm.

Example 3

Like Example 1, but polymerization is carried out in the last stage of the polycondensation at 300° C. for 1.5 hours. A light-coloured solvent-free polycarbonate is obtained with a relative solution viscosity of 1.309 (dichloromethane, 25° C., 5 g/l). The polycarbonate produced contains 25 ppm of the branching agent of formula (VI). The phenolic OH value of the polycarbonate is 283 ppm.

Example 4

114.15 g (0.500 mol) bisphenol A and 113.54 g (0.530 mole) diphenyl carbonate are weighed into a 500 ml three-necked flask with agitator, internal thermometer and Vigreux column (30 cm, metallized) with bridge. Atmospheric oxygen is removed from the apparatus by applying a vacuum and purging with nitrogen (3 moles) and the mixture heated to 150° C. 0.000349 g ($5 \times 10^{-4}$ mole % relative to bisphenol A) of 1,5,7-triazabicyclo[4.4.0]dec-5-ene is now added as a 1% aqueous solution and the phenol arising distilled off at 100 mbar. Simultaneously the temperature is raised to 250° C. The vacuum is now improved in stages to 1 mbar and the temperature raised to 260° C. A light-coloured solvent-free oligocarbonate is obtained with a relative solution viscosity of 1.157 (dichloromethane, 25° C., 5 g/l). The content of the branching agent of formula(VI) in the oligocarbonate produced is less than 2 ppm. To the oligocarbonate there is now added 0.0001 g NaOH ($5 \times 10^{-4}$ mole % relative to bisphenol A) as a 1% aqueous solution and the oligocarbonate agitated at 280° C. and 0.1 mbar for 1.5 hours. A light-coloured solvent-free polycarbonate is obtained with a relative solution viscosity of 1.333 (dichloromethane, 25° C., 5 g/l). The polycarbonate produced contains 43 ppm of the branching agent of formula (VI). The phenolic OH value of the polycarbonate is 241 ppm.

Example 5

114.15 g (0.500 mol) bisphenol A and 113.54 g (0.530 mole) diphenyl carbonate are weighed into a 500 ml three-necked flask with agitator, internal thermometer and Vigreux column (30 cm, metallized) with bridge. Atmospheric oxygen is removed from the apparatus by application of a vacuum and purging with nitrogen (3 moles) and the mixture heated to 150° C. 0.000349 g ($5 \times 10^{-4}$ mole %  relative to bisphenol A) of 1,5,7-triazabicyclo[4.4.0]dec-5-ene is now added as a 1% aqueous solution and the phenol arising distilled off at 100 mbar. Simultaneously the temperature is raised to 250° C. The vacuum is now improved in stages to 1 mbar and the temperature raised to 280° C. A light-coloured solvent-free oligocarbonate is obtained with a relative solution viscosity of 1.203 (dichloromethane, 25° C., 5 g/l). The oligocarbonate produced contains less than 2 ppm of the branching agent of formula (VI). To the oligocarbonate there is now added 0.0001 g NaOH-($5 \times 10^{-4}$ mole % relative to bisphenol A) as a 1% aqueous solution and the oligocarbonate agitated at 280° C. and 0.1 mbar for 1.5 hours. A light-coloured solvent-free polycarbonate is obtained with a relative solution viscosity of 1.314 (dichloromethane, 25° C., 5 g/l). The polycarbonate produced contains 32 ppm of the branching agent of formula (VI). The phenolic OH value of the polycarbonate is 290 ppm.

Example 6

Like Example 1, but 0.0090 g ($1 \times 10^{-2}$ mole %) of guanidine carbonate is used. A light-coloured solvent-free polycarbonate is obtained with a relative solution viscosity of 1.282 (dichloromethane, 25° C., 5 g/l). The polycarbonate produced contains 54 ppm of the branching agent of formula (VI). The phenolic OH value of the polycarbonate is 360 ppm.

Example 7

Like Example 1, but 0.000765 g ($1 \times 10^{-3}$ mole %) of 7-methyl-1,5,7-triazabicyclo[4.4.0]dec-5-ene is used. A light-coloured solvent-free polycarbonate is obtained with a relative solution viscosity of 1.230 (dichloromethane, 25° C., 5 g/l). The polycarbonate produced contains 10 ppm of the branching agent of formula (VI). The phenolic OH value of the polycarbonate is 180 ppm.

Example 8

Like Example 1, but 0.00105 g ($1 \times 10^{-3}$ mole %) of N,N-diphenylguanidine is used. A light-coloured solvent-free polycarbonate is obtained with a relative solution viscosity of 1.271 (dichloromethane, 25° C., 5 g/l). The polycarbonate produced contains 10 ppm of the branching agent of formula (VI). The phenolic OH value of the polycarbonate is 320 ppm.

Example 9

Like Example 1, but 0.00236 g ($5 \times 10^{-4}$ mole %) of 7,7'-dodecylidene-di-1,5,7-triazabicyclo[4.4.0]dec-5-ene is used. A light-coloured solvent-free polycarbonate is obtained with a relative solution viscosity of 1.254 (dichloromethane, 25° C., 5 g/l). The polycarbonate produced contains 8 ppm of the branching agent of formula (VI). The phenolic OH value of the polycarbonate is 230 ppm.

Example 10

5,130 g (22.5 mole) bisphenol A, 5,152 g (24.07 mole) diphenyl carbonate and 31.26 mg 1,5,7-triazabicyclo-[4.4.0]dec-5-ene ($1 \times 10^{-3}$ mole %) are weighed into a 25 litre agitated vessel. The atmosphere of the vessel is rendered inert with nitrogen and the raw materials are heated to 200° C. in 15 minutes. At a batch temperature of 100° C., the agitator is switched on and a vacuum of 300 mbar applied. The temperature is maintained for 1 hour at 200° C. and liberated phenol distilled off via a column. Over one further hour, the temperature is raised to 250° C. and the vacuum improved to 100 mbar and subsequently in 30 minutes at 250° C. to 10 mbar. After raising the batch temperature to 290° C., polycondensation is carried out at this temperature in the high vacuum. After sweeping with nitrogen, the polycarbonate is discharged from the vessel and granulated. The polycarbonate isolated has a relative solution viscosity of 1.213 (dichloromethane, 25° C., 5 g/l) and contains 30 ppm of the branching agent of formula (VI).

Example 11

5,130 g (22.5 mole) bisphenol A, 5,104 g (23.85 mole) diphenyl carbonate and 106.15 mg 7,7'-dodecylidene-di1,5,7-triazabicyclo[4.4.0]dec-5-ene ($1 \times 10^{-3}$ mole %) are weighed into a 25 litre agitated vessel. The atmosphere of the vessel is rendered inert with nitrogen and the raw materials are heated to 200° C. in 15 minutes. At a batch temperature of 100° C., the agitator is switched on and a vacuum of 300 mbar applied. The temperature is maintained for 1 hour at 200° C. and liberated phenol distilled off via a column. Over one further hour, the temperature is raised to 250° C. and the vacuum improved to 100 mbar and subsequently in 30 minutes at 250° C. to 10 mbar. After raising the batch temperature to 290° C., polycondensation is carried out at this temperature. After sweeping with nitrogen, the polycarbonate is discharged from the vessel and granulated. The polycarbonate isolated has a relative solution viscosity of 1.243 (dichloromethane, 25° C., 5 g/l) and contains 50 ppm of the branching agent of formula (VI).

Example 12

5,130 g (22.5 mole) bisphenol A, 5,104 g (23.85 mole) diphenyl carbonate and 31.26 mg 1,5,7-triazabicyclo-[4.4.0]dec-5-ene ($1 \times 10^{-3}$ mole %) are weighed into a 25 litre agitated vessel. The atmosphere of the vessel is rendered inert with nitrogen and the raw materials are heated to 200° C. in 15 minutes. At a batch temperature of 100° C., the agitator is switched on and a vacuum of 300 mbar applied. The temperature is maintained for 1 hour at 200° C. and liberated phenol distilled off via a column. Over one further hour, the temperature is raised to 250° C. and the vacuum improved to 100 mbar and subsequently in 30 minutes at 250° C. to 10 mbar. After raising the batch temperature to 290° C. and sweeping with nitrogen, 13 mg sodium phenolate ($5 \times 10^{-4}$ mole %) is added. High vacuum is applied and polycondensation is carried out at 290° C. After sweeping with nitrogen, the polycarbonate is discharged from the vessel and granulated. The polycarbonate isolated has a relative solution viscosity of 1.289 (dichloromethane, 25° C., 5 g/l) and contains 90 ppm of the branching agent of formula (VI).

Example 13

5,130 g (22.5 mole) bisphenol A, 5,104 g (23.85 mole) diphenyl carbonate and 62.52 mg 1,5,7-triazabicyclo-[4.4.0]dec-5-ene ($2 \times 10^{-3}$ mole %) are weighed into a 25 litre agitated vessel. The atmosphere of the vessel is rendered inert with nitrogen and the raw materials are heated to 200° C. in 15 minutes. At a batch temperature of 100° C., the agitator is switched on and a vacuum of 300 mbar applied. The temperature is maintained for 1 hour at 200° C. and liberated phenol distilled off via a column. Over one further hour, the temperature is raised to 250° C. and the vacuum improved to 100 mbar and subsequently in 30 minutes at 250° C. to 5 mbar. After raising the batch temperature to 290° C. the system is swept with nitrogen and the oligomer formed is discharged from the vessel and granulated. It has at this time a relative solution viscosity of 1.153 (dichloromethane, 25° C., 5 g/l). This oligocarbonate is polycondensed on a ZSK 32 (100 rpm, 300° C., 0.8 mbar, 2.0 kg/h). The polycarbonate thus isolated has a relative solution viscosity of 1.273 (dichloromethane, 25° C., 5 g/l) and contains 20 ppm of the branching agent of formula (VI).

Example 14

5,130 g (22.5 mole) bisphenol A, 5,104 g (23.85 mole) diphenyl carbonate and 31.26 mg 1,5,7-triazabicyclo-[4.4.0]dec-5-ene ($1 \times 10^{-3}$ mole %) are weighed into a 25 litre agitated vessel. The atmosphere of the vessel is rendered inert with nitrogen and the raw materials are heated to 200° C. in 15 minutes. At a batch temperature of 100° C., the agitator is switched on and a vacuum of 300 mbar applied. The temperature is maintained for 1 hour at 200° C. and liberated phenol distilled off via a column. Over one further hour, the temperature is raised to 250° C. and the vacuum improved to 100 mbar and subsequently in 30 minutes at 250° C. to 5 mbar. After raising the batch temperature to 290° C. the system is swept with nitrogen and the oligomer formed is discharged from the vessel and granulated. It has at this time a relative solution viscosity of 1.147 (dichloromethane, 25° C., 5 g/l). After spreading $1 \times 10^{-3}$ mole % sodium phenolate onto the oligocarbonate, polycondensation is carried out on a ZSK 32 (100 rpm, 300° C., 0.8 mbar, 4.0 kg/h). The polycarbonate isolated has a relative solution viscosity of 1.303 (dichloromethane, 25° C., 5 g/l) and contains 35 ppm of the branching agent of formula (VI).

Example 15

Like Example 1, but 0.0017 g ($1 \times 10^{-3}$ mole %) of 7-cumylphenyl-1,5,7-triazabicyclo[4.4.0]dec-5-ene is used. A light-coloured solvent-free polycarbonate is obtained with a relative solution viscosity of 1.263 (dichloromethane, 25° C., 5 g/l). The polycarbonate produced contains 12 ppm of the branching agent of formula (VI) and its phenolic OH value is 245 ppm.

Example 16

Like Example 1, but 0.00112 g ($1 \times 10^{-3}$ mole %) of 7-hexyl-1,5,7-triazabicyclo[4.4.0]dec-5-ene is used. A light-coloured solvent-free polycarbonate is obtained with a relative solution viscosity of 1.278 (dichloromethane, 25° C., 5 g/l). The polycarbonate produced contains 22 ppm of the branching agent of formula (VI) and has a phenolic OH value of 285 ppm.

We claim:

1. A transesterification process for the production of thermoplastic, solvent-free polycarbonate starting from aromatic diphenols, carbonic acid diaryl esters and optionally branching agents and/or monophenols as well as at least one guanidine-derived catalyst at temperatures between 80° C. and 400° C. and pressures of 1000 mbar to 0.01 mbar, characterized in that said catalyst is selected from the group consisting of compounds corresponding to formula (a)

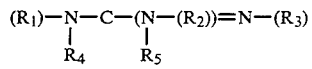

wherein
$R_1$, $R_2$, $R_3$, $R_4$, $R_5$=H, alkyl, alkenyl, cycloalkyl, cycloalkenyl or aryl and the groups $R_1$, $R_2$, $R_3$, $R_4$ and $R_5$ can be the same or different,
and formula (b)

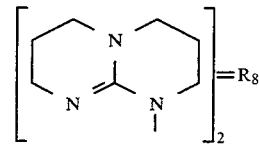

wherein
$R_8$ can be alkylidene, cycloalkylidene or arylalkylidene,
and formula (c)

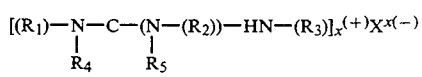

wherein
X can be carbonate, acetate, nitrate, hydroxide, halide, phenolate, diphenolate, phosphate, hydrogen phosphate or boranate and
$R_1$, $R_2$, $R_3$, $R_4$, $R_5$=H, alkyl, alkenyl, cycloalkyl, cycloalkenyl or aryl and the groups $R_1$, $R_2$, $R_3$, $R_4$ and $R_5$ can be the same or different said guanidine-derived catalyst being used in an amount of $10^{-2}$ to $10^{-8}$ mole relative to 1 mole of diphenols, said polycarbonate having a weight average molecular weight of 18,000 to 60,000 as determined by measurement of the relative solution viscosity in dichloromethane or in a mixture of equal parts by weight of phenol and 0-dichlorobenzene, calibrated by light scattering and OH-end-group content of less than 700 ppm.

2. A process for the production of aromatic polycarbonates according to claim 1, characterized in that the content of the branching structure of formula (Va)

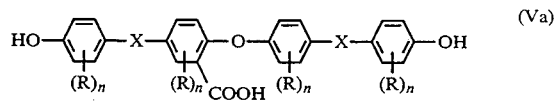

with
$X = C_1-C_8$ alkylidene or cycloalkylidene, S or a single bond and
$R = CH_3$, Cl or Br and
n=zero, 1 or 2,
in the polycarbonate does not, according to determination by total saponification and HPLC, exceed a value of 300 ppm.

3. A process for the production of aromatic polycarbonate according to claim 1, characterized in that the catalysts are used in combination with alkali metal/alkaline earth metal catalysts.

* * * * *